No. 646,292. Patented Mar. 27, 1900.
N. LOMBARD.
SAFETY VALVE FOR WATER FEED PIPES.
(Application filed July 12, 1899.)
(No Model.) 3 Sheets—Sheet 1.

WITNESSES
INVENTOR

No. 646,292. Patented Mar. 27, 1900.
N. LOMBARD.
SAFETY VALVE FOR WATER FEED PIPES.
(Application filed July 12, 1899.)
(No Model.) 3 Sheets—Sheet 2.

WITNESSES
INVENTOR

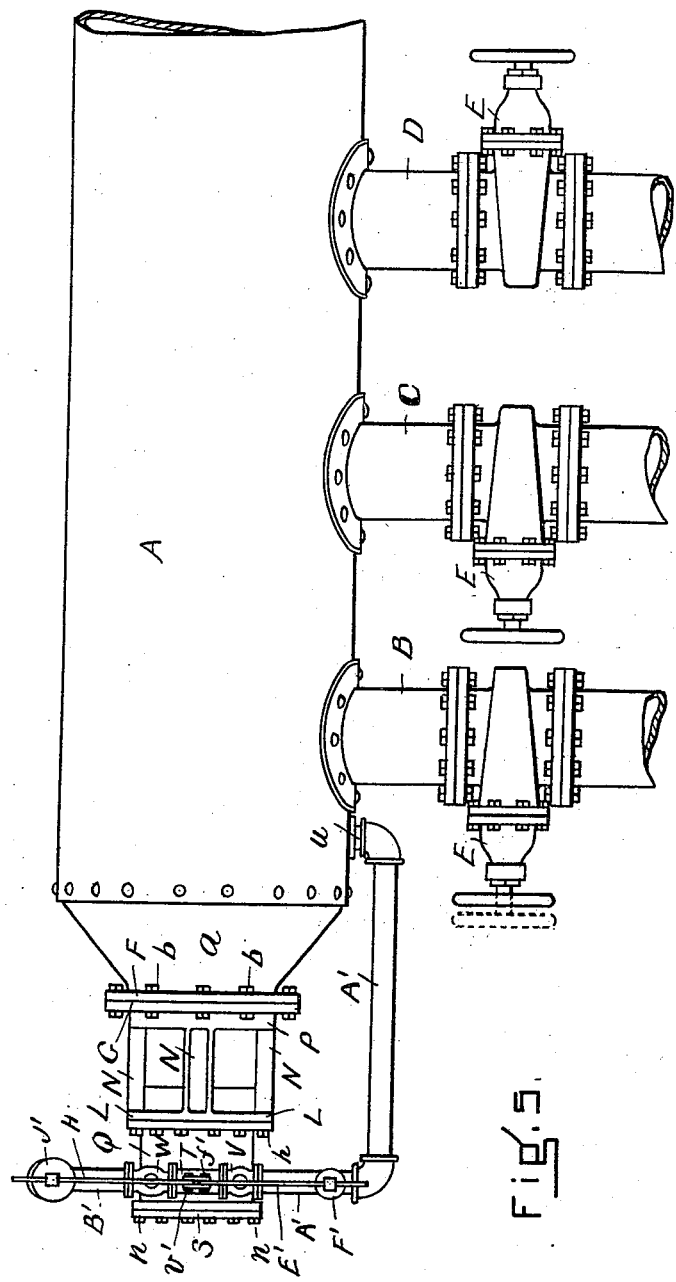

United States Patent Office.

NATHANIEL LOMBARD, OF BOSTON, MASSACHUSETTS, ASSIGNOR TO THE LOMBARD WATER WHEEL GOVERNOR COMPANY, OF SAME PLACE AND PORTLAND, MAINE.

SAFETY-VALVE FOR WATER-FEED PIPES.

SPECIFICATION forming part of Letters Patent No. 646,292, dated March 27, 1900.

Application filed July 12, 1899. Serial No. 723,574. (No model.)

*To all whom it may concern:*

Be it known that I, NATHANIEL LOMBARD, of Boston, in the county of Suffolk and State of Massachusetts, have invented certain new and useful Improvements in Safety-Valves for Water-Feed Pipes, of which the following is a full, clear, and exact description.

This invention has for its object the regulation and control of the pressure of water in a pipe or tube leading from a water supply or head with more or less pressure to a waterwheel or other device for operation thereof by the water, so that with the water from such feed-pipe operating a water-wheel, &c., if the water should be suddenly shut off from the water-wheel the extra pressure which would naturally occur in the feed-pipe by the stoppage of the flow of water to the waterwheel would be relieved, regulated, and finally controlled by the use of the present invention, so that no damage to the feed-pipe or other parts would result, as it otherwise might; and the invention consists in combination, with a pipe leading from and connected to a suitable water-supply having more or less pressure and to a water-wheel or other device for operation thereof by the water, of a valve, a piston connected thereto, and other valves, all so arranged together as to act from the pressure of the water in the feed-pipe to relieve and regulate the pressure of the water in and upon the feed-pipe should the water be suddenly, partially, or wholly shut off from the water-wheel or other device at any time, all substantially as hereinafter fully described, reference being had to the accompanying sheets of drawings, in which is illustrated the present invention constructed and arranged for operation in connection with a water-feed pipe.

Figure 1:
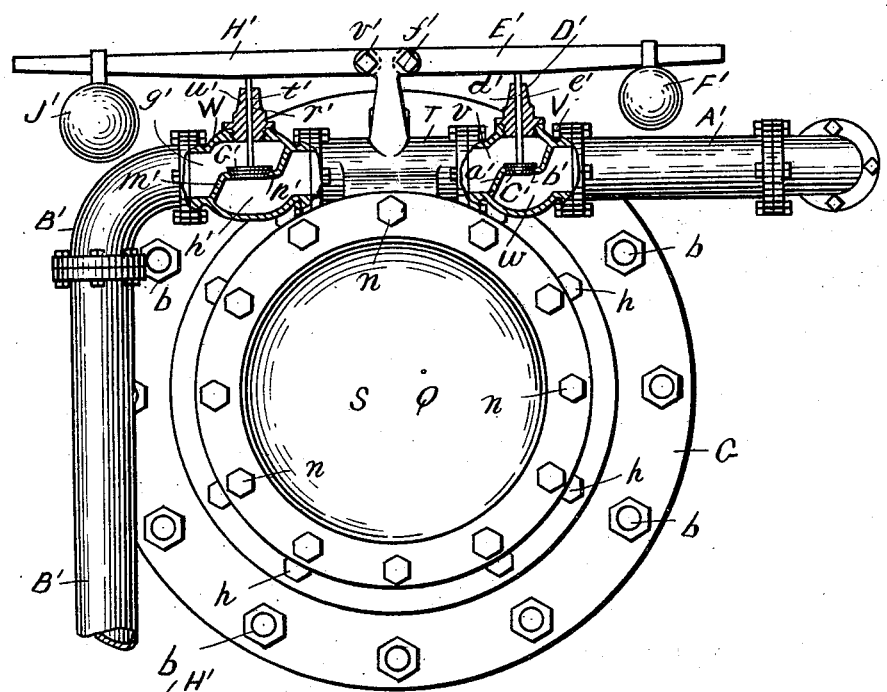
Figure 2:
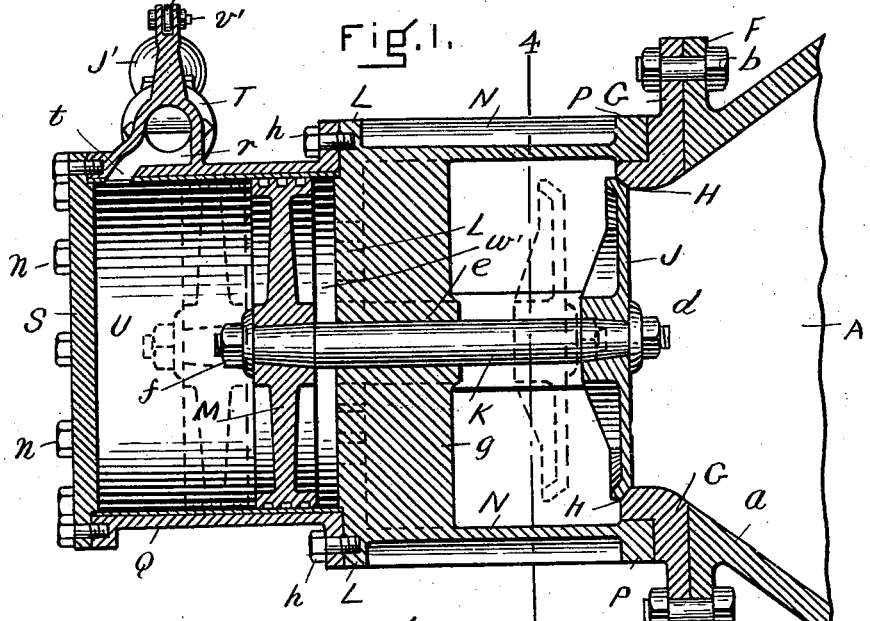
Figure 3:
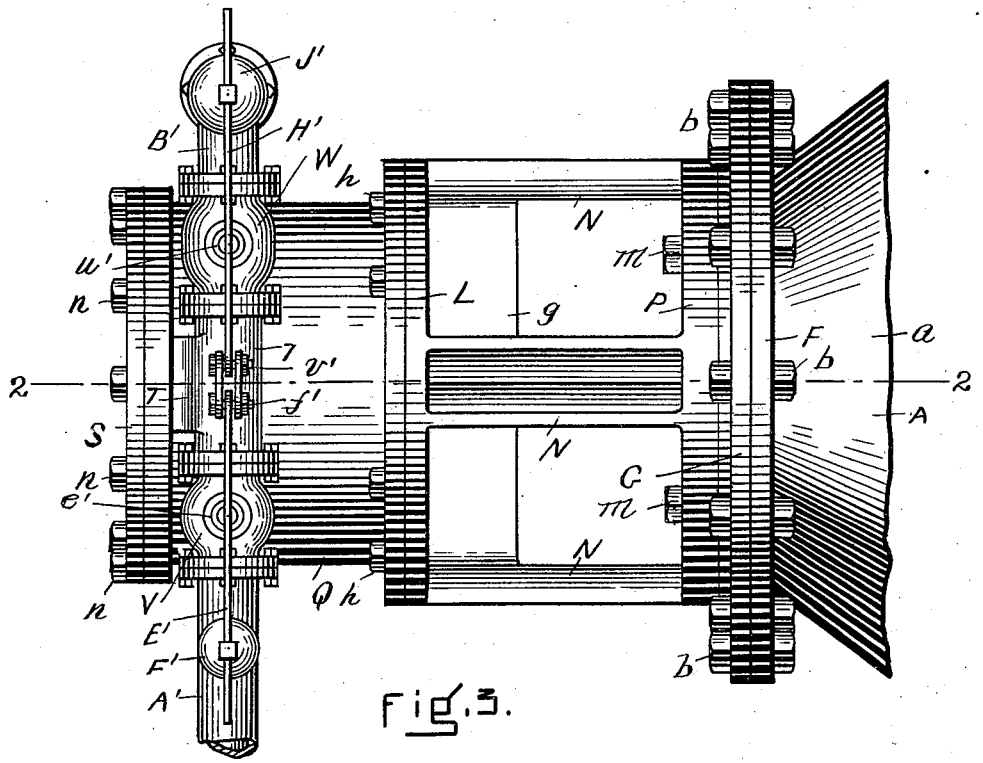
Figure 4:
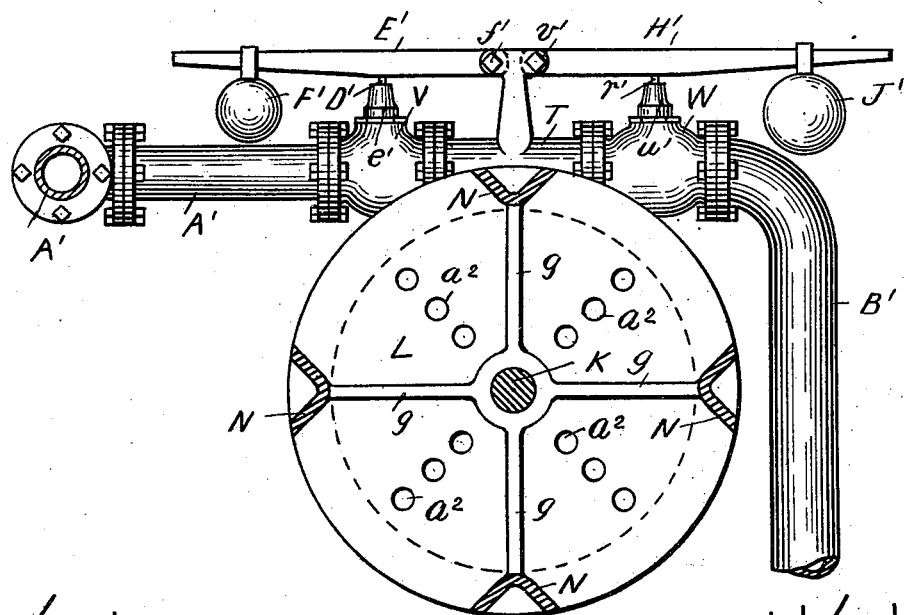

Figure 1 represents an end view of a casing or cylinder secured to the end of a waterfeed pipe containing a valve and other parts connected therewith and arranged for operation in accordance with this invention. Fig. 2 is a longitudinal central section on line 2 2, Fig. 3. Fig. 3 is a plan view of Fig. 1 of the casing or cylinder attached to the end of the water-feed pipe, which is broken off. Fig. 4 is a cross-section on line 4 4, Fig. 2. Fig. 5 represents in general view in plan the end of a water-feed pipe with this improved valve and its connections attached to the pipe with three pipes leading from the side of the feedpipe to three separate water-wheels or other devices for operation thereof by the water from the feed-pipe, each side pipe having a valve for letting on and shutting off the water from the water-feed pipe.

In the drawings, A represents the lower end of a water-pipe leading from and connected to any suitable water-supply for the proper pressure at the end of the pipe to drive one or more water-wheels.

B C D are three separate pipes, broken off, but connected to and communicating with the feed-pipe, each for operation of a separate water-wheel by the water from the feedpipe, each pipe having a valve E for letting on and shutting off the supply of water thereto from the feed-pipe, and all constructed and arranged for operation as usual in such pipes and needing no more particular description herein.

The feed-pipe A, near its end, tapers gradually to the end, as at $a$, to a diameter corresponding to the size of the valve to be connected thereto and having on its end an outer rim or flange F. To this flange F is secured by bolts $b$ a flat ring or flange G, provided on its inner edge with a circular valve-seat H for the valve J, this valve being secured by a central bolt $d$ to a stem or rod K, which extends forward and passes centrally through an opening $e$ in a circular plate L and having on its other end a piston M, secured thereto by a bolt $f$. The plate L has radial ribs $g$ on one side, and from its edge integral therewith extend backward four V-shaped bars or arms N and having a ring P at their ends, by which the plate and its arms are secured to the valveseat ring G by bolts $m$. The piston M is within a casing or cylinder Q, having a head S secured thereto by bolts $n$, and its other end is secured by bolts $h$ to the ribbed plate, all as shown.

T is a side projection of the cylinder-chamber U, having a chamber $r$ communicating by a passage $t$ with the cylinder-chamber U, and to each end of the projection is secured, respectively, a valve-cylinder V W, to one, V, of which is attached a pipe A', which extends laterally a short distance and then longitudinally parallel with the feed-pipe and is attached to and in communication with the same at $u$. To the other valve-cylinder W is secured a pipe B', which curves downward and extends a short distance, its outer end being open. The valve-cylinder V is divided horizontally into two compartments $v$ $w$ by a partition $a'$, having an opening $b'$ through it, forming a seat for a valve C', called a "reducing-valve," its stem D' extending upward through an opening $d'$ in a support $e'$. A lever E', pivoted at $f'$ to the extension, rests on the valve-stem D' and has a weight F' arranged to slide along its length to increase or diminish the pressure of the lever E' on its valve C'. The other cylinder W is divided into two compartments $g'$ $h'$ by a partition $m'$, having an opening $n'$ therethrough for a valve G', its stem $r'$ extending up through an opening $t'$ in a support $u'$ in position for a lever H', pivoted at $v'$, to rest thereon and which has a weight J' arranged to slide thereon to increase or diminish the pressure of the lever on its valve G'. With both valves C' G' open, water can pass from the feed-pipe A through the pipe A' and the valve-chambers to and out at the pipe B', as well as into and from the piston-chamber, and with water in the feed-pipe the valve C' is opened to let water through the pipe A' into the piston-cylinder, when the valve J is then closed and the feed-pipe in condition for operation.

The piston M is of larger diameter than the diameter of the valve J, attached thereto, in order that when the water is passing through the feed-pipe to the water-wheel for operation thereof from the connection of the pipe A' therewith it will hold the valve to its seat against the direct pressure from the water-supply, balancing the valve, and insuring the maintenance of the valve on its seat to close its opening H when running the water-wheel.

The weight on the reducing-valve C' is adjusted on its lever E' to exert a little less pressure on its valve than the pressure of the water in the feed-pipe, and the weight on the lever of valve G' is adjusted to exert the same pressure as the reducing-valve C'.

If water is shut off from one of the water-wheel pipes, the pressure of the water in the feed-pipe at its end is increased correspondingly, which forces the valve J open and the piston back, at the same time opening the small valve G', allowing water in the piston-chamber to pass out through the waste-pipe B', also opening the reducing-valve C', and allowing water from the communicating pipe A' to pass through the valve-opening out at the waste-pipe, and by the increase of the water-pressure in the feed-pipe and the escape of water from the piston-chamber the pressure of water upon the piston is so lessened that the pressure on the valve J opens it more or less for the discharge of water at the openings between the arms N, relieving the pressure in the feed-pipe, which as the water therein becomes slower in its movements gradually allows the valve J to close, and when wholly closed the pressure of the water in the feed-pipe is reduced to its regular pressure again, and the two valves C' G' also close, and all parts are returned to their normal positions.

As some water may leak into the portion $w'$ of the cylinder-chamber between the piston and the plate L, holes $a^2$ are made in the plate to allow escape of such water as the piston moves back to close the valve.

The valve G' is a little larger than the reducing-valve C' to allow the free passage of water from the cylinder and the communicating pipe A' when the pressure is increased in the feed-pipe and the valve J is opened.

The weights to the valve-levers can be moved on their respective levers to make more or less pressure upon their respective valves to suit the varying pressure of the water in the feed-pipe at different times when operating, so that if one or more of the water-wheel pipes are shut off the valves will work as described to relieve and regulate the pressure upon the feed-pipe at such time.

The pipes A' B' are practically one pipe provided with the valves, as shown.

Having thus described my invention, what I claim is—

1. In combination with a water-feed pipe to a water-wheel or other water-operating device having an opening at or near its end, of a valve to said opening, a piston connected to said valve of larger diameter in a cylinder or chamber, a pipe connected to and communicating with said water-feed pipe and the piston cylinder or chamber and valves in said communicating pipe for operation substantially as described.

2. In combination with a water-feed pipe to a water-wheel or other water-operating device having an opening at or near its end, of a valve to said opening, a piston connected to said valve of larger diameter, in a cylinder or chamber, a pipe connected to and communicating with said water-feed pipe and said piston cylinder or chamber, and two valves in said communicating pipe, one of which valves is of larger diameter than the other for operation substantially as described.

3. In combination with a water-feed pipe to a water-wheel or other water-operating device having an opening at or near one end, of a valve to said opening, a piston connected to said valve of larger diameter in a cylinder or chamber, a pipe connected to and communicating with said water-feed pipe and said piston cylinder or chamber, two valves in said communicating pipe, one of which valves is of larger diameter than the other and a lever to each of said two valves each having a weight adjustable thereon for operation substantially as described.

In testimony whereof I have hereunto set my hand in the presence of two subscribing witnesses.

NATHANIEL LOMBARD.

Witnesses:
EDWIN W. BROWN,
JOHN A. ROCHE.